(12) United States Patent
Alwan et al.

(10) Patent No.: US 11,117,619 B2
(45) Date of Patent: Sep. 14, 2021

(54) VEHICLE FRAME ASSEMBLY

(71) Applicant: Ford Global Technologies, LLC, Dearborn, MI (US)

(72) Inventors: Jamil M. Alwan, Ann Arbor, MI (US); Djamal Eddine Midoun, Ann Arbor, MI (US); Sean Timothy Ryan, Farmington Hills, MI (US); Hassan Najib Dubaisi, Dearborn Heights, MI (US); Harish Honnavalli Dutt, Canton, MI (US); Peyman Aghssa, Ann Arbor, MI (US); Zakareia H. Hussain, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 116 days.

(21) Appl. No.: 16/563,978

(22) Filed: Sep. 9, 2019

(65) Prior Publication Data

US 2021/0070367 A1 Mar. 11, 2021

(51) Int. Cl.
| | | |
|---|---|---|
| *B62D 21/15* | (2006.01) | |
| *B62D 43/04* | (2006.01) | |
| *B60R 19/24* | (2006.01) | |
| *B62D 21/02* | (2006.01) | |

(52) U.S. Cl.
CPC .............. *B62D 21/15* (2013.01); *B60R 19/24* (2013.01); *B62D 21/02* (2013.01); *B62D 43/04* (2013.01)

(58) Field of Classification Search
CPC ........ B62D 21/15; B62D 21/02; B62D 43/04; B60R 19/24
USPC ...................................... 296/187.03
See application file for complete search history.

(56) References Cited

U.S. PATENT DOCUMENTS

| | | | | |
|---|---|---|---|---|
| 5,419,609 | A * | 5/1995 | Kmiec ............... | B62D 21/152 296/187.11 |
| 7,270,365 | B2 * | 9/2007 | Suzuki ............... | B62D 25/087 296/187.08 |
| 8,371,595 | B2 | 2/2013 | Taneda et al. | |
| 8,388,041 | B2 * | 3/2013 | Sakita ............... | B62D 21/152 296/37.2 |
| 8,657,364 | B2 | 2/2014 | Yamada et al. | |
| 8,857,898 | B1 | 10/2014 | Dubaisi et al. | |
| 2016/0052551 | A1 | 2/2016 | Arora et al. | |

* cited by examiner

*Primary Examiner* — Joseph D. Pape
*Assistant Examiner* — Dana D Ivey
(74) *Attorney, Agent, or Firm* — Frank A. MacKenzie; Bejin Bieneman PLC

(57) ABSTRACT

A vehicle includes a pair of frame rails elongated along a longitudinal axis, each of the frame rails having a downward deformation zone, the frame rails bendable at the downward deformation zones from a first position to a second position beneath the first position. The vehicle includes a tire supported between the pair of frame rails at the downward deformation zones. The vehicle includes a spare tire retention member supported between the pair of frame rails forward of the downward deformation zones.

20 Claims, 5 Drawing Sheets

VEHICLE FRAME ASSEMBLY

BACKGROUND

A vehicle may include a frame assembly that supports components and systems of the vehicle, e.g., a propulsion system, a braking system, seats for use by an occupant of the vehicle, etc. The frame assembly may be of a unibody construction. In the unibody construction, a body, e.g., rockers, pillars, roof rails, etc., serves as the vehicle frame, and the body (including the rockers, pillars, roof rails, etc.) may be unitary, i.e., a continuous one-piece unit. As another example, the frame assembly may have a body-on-frame construction (also referred to as a cab-on-frame construction). In other words, the body and frame are separate components, i.e., are modular, and the body is supported on and affixed to the frame. Alternatively, the frame assembly may have any suitable construction. The frame assembly may be formed of any suitable material, for example, steel, aluminum, carbon fiber, etc.

DETAILED DESCRIPTION

Figure 1:
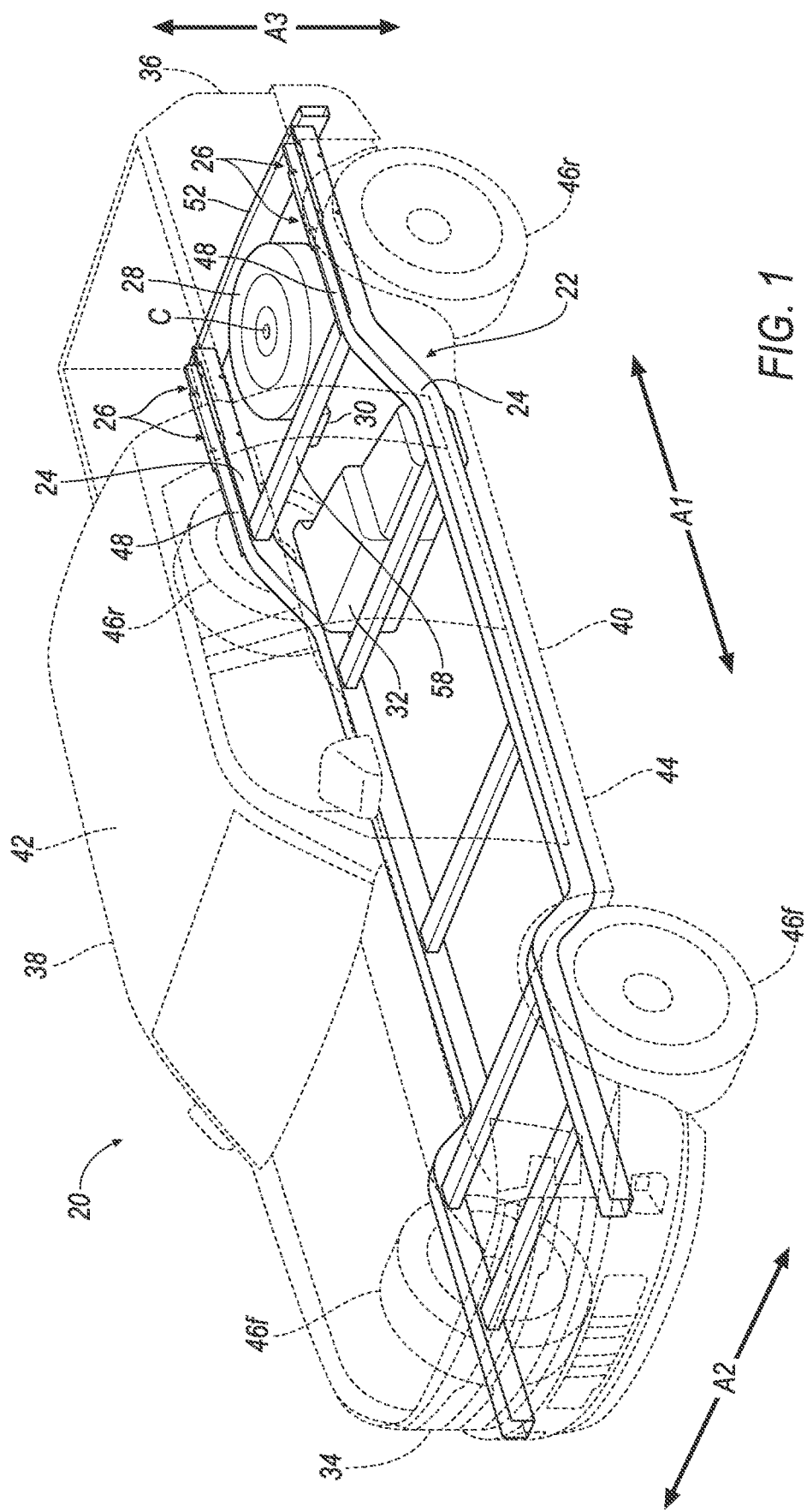
FIG. 1 is a top perspective view of a vehicle.

A vehicle includes a pair of frame rails elongated along a longitudinal axis, each of the frame rails having a downward deformation zone, the frame rails bendable at the downward deformation zones from a first position to a second position beneath the first position. The vehicle includes a tire supported between the pair of frame rails at the downward deformation zones. The vehicle includes a spare tire retention member supported between the pair of frame rails forward of the downward deformation zones.

Each of the frame rails may include a second downward deformation zone, and a center of the tire is between the downward deformation zones and the second deformation zones along the longitudinal axis.

The vehicle may include a pair of rear tires supported outboard of the frame rails, the downward deformation zones rearward of the pair of rear tires.

The vehicle may include an energy storage device supported forward of the tire.

The tire may be beneath the energy storage device when the frame rails are in the second position.

Each of the downward deformation zones may include a weakened feature at a bottom of the respective frame rail.

Each of the downward deformation zones may include a second weakened feature at the bottom of the respective frame rail and opposite the weakened feature along a lateral axis.

Each of the downward deformation zones may include a reinforcement at a top of the respective frame rail.

The vehicle may include a crossmember elongated along a lateral axis and fixed to the frame rails, the spare tire retention member fixed to the crossmember.

The crossmember may defines a chamber, and the vehicle may include a diaphragm in the chamber, the spare tire retention member at the diaphragm.

The crossmember may include a bottom surface and a rear surface, the spare tire retention member fixed to the bottom surface and the rear surface.

An assembly includes a pair of frame rails elongated along a longitudinal axis, each of the frame rails having a downward deformation zone, the frame rails bendable at the downward deformation zones from a first position to a second position beneath the first position. The assembly includes a spare tire retention member supported between the between the pair of frame rails forward of the downward deformation zones.

Each of the downward deformation zones may include a weakened feature at a bottom of the respective frame rail.

Each of the downward deformation zones may include a second weakened feature at the bottom of the respective frame rail and opposite the weakened feature along a lateral axis.

Each of the downward deformation zones may include a reinforcement at a top of the respective frame rail.

The assembly may include a crossmember elongated along the lateral axis and fixed to the frame rails, the spare tire retention member fixed to the crossmember.

The crossmember may define a chamber, and the assembly may include a diaphragm in the chamber, the spare tire retention member at the diaphragm.

The assembly may include a tire mount between the frame rails, the tire supported by the tire mount.

The assembly may include a bumper beam elongated along a lateral axis and supported by the frame rails, the downward deformation zones between the spare tire retention member and the bumper beam.

Each of the frame rails may include a second downward deformation zone rearward of the spare tire retention member and spaced from the downward deformation zones along the longitudinal axis.

With reference to the Figures, wherein like numerals indicate like parts throughout the several views, a vehicle 20 includes a frame assembly 22 having a pair of frame rails 24 elongated along a longitudinal axis A1. Each of the frame rails 24 has one or more downward deformation zones 26. The frame rails 24 are bendable at the downward deformation zones 26 from a first position to a second position beneath the first position. The vehicle 20 includes a spare tire 28 supported between the pair of frame rails 24 at the downward deformation zones 26. The frame assembly 22 includes a spare tire retention member 30 supported between the pair of frame rails 24 forward of the downward deformation zones 26.

The frame assembly 22 reduces a probability of interference of the spare tire 28 with an energy storage device 32 of the vehicle 20 during a rear impact to the vehicle 20, e.g., by moving from the first position to the second position as described beneath.

The adjectives "first" and "second" are used throughout this document as identifiers and are not intended to signify importance or order.

The vehicle 20 may be any type of passenger or commercial automobile such as a car, a truck, a sport utility vehicle, a crossover vehicle, a van, a minivan, a taxi, a bus, etc.

The vehicle 20 defines the longitudinal axis A1, e.g., extending between a front 34 and a rear 36 of the vehicle 20. The vehicle 20 defines a lateral axis A2, e.g., extending between a right side 38 and a left side 40 of the vehicle 20. The vehicle 20 defines a vertical axis A3, e.g., extending between a top 42 and a bottom 44 of the vehicle 20. The longitudinal axis A1, the lateral axis A2, and the vertical axis A3 are perpendicular to each other.

The vehicle 20 includes tires 46f, 46r. The tires 46f, 46r support the vehicle 20, e.g., on a road surface. The tires 46f, 46r provide movement to the vehicle 20, e.g., by transferring force to the road surface from a propulsion system and/or a braking system of the vehicle 20, by changing angle relative to a body of the vehicle 20, etc. The tires 46f, 46r may be tubeless tires 46f, 46r supported on a rim, or any suitable type. Tires 46f, 46r may by at the front 34 and the rear 36 of the vehicle 20, e.g., a pair of rear tires 46r and a pair of front tires 46f. The tires 46f, 46r may be supported outboard of the frame rails 24. In other words, the frame rails 24 may be closer to a center of the vehicle 20 than the tires 46f, 46r, e.g., relative to the lateral axis A2.

The propulsion system translates the energy into motion of the vehicle 20. The propulsion system may be, for example, a conventional powertrain including an internal-combustion engine coupled to a transmission that transfers rotational motion to the tires 46f, 46r; an electric powertrain including batteries, an electric motor, and a transmission that transfers rotational motion to the tires 46f, 46r; a hybrid powertrain including elements of the conventional powertrain and the electric powertrain; or any other type of propulsion.

The frame assembly 22 supports components and systems of the vehicle 20, e.g., the propulsion system, the braking system, seats for use by an occupant of the vehicle 20, etc. The frame assembly 22 may be of a unibody construction. In the unibody construction, a body, e.g., rockers, pillars, roof rails, etc., serves as the vehicle frame, and the body (including the rockers, pillars, roof rails, etc.) may be unitary, i.e., a continuous one-piece unit. As another example, the frame assembly 22 may have a body-on-frame construction (also referred to as a cab-on-frame construction). In other words, the body and frame are separate components, i.e., are modular, and the body is supported on and affixed to the frame. Alternatively, the frame assembly 22 may have any suitable construction. The frame assembly 22 may be formed of any suitable material, for example, steel, aluminum, carbon fiber, etc.

The pair of frame rails 24 of the frame assembly 22 are elongated along the longitudinal axis A1. For example, the frame rails 24 may be elongated between the front 34 and the rear 36 of the vehicle 20. The frame rails 24 may extend to the rear 36 of the vehicle 20. The frame rails 24 are spaced from each other along the lateral axis A2. For example, the one of the frame rails 24 may be proximate the right side 38 of the vehicle 20, i.e., closer to the right side 38 than the left side 40, and the other frame rail 24 may be proximate the left side 40 of the vehicle 20. The frame rails 24 each have a top 48 and a bottom 50 opposite the top 48. The top 48 is above the bottom 50, e.g., relative to the vertical axis A3.

The frame assembly 22 may include a bumper beam 52 at the rear 36 of the vehicle 20. The bumper beam 52 absorbs force and transfers force, such as force from a rear impact, to the frame rails 24. The bumper beam 52 is elongated along the lateral axis A2. The bumper beam 52 may be supported by the frame rails 24. For example, the bumper beam 52 may be fixed to the frame rails 24 via fasteners, weld, etc.

Figure 2:
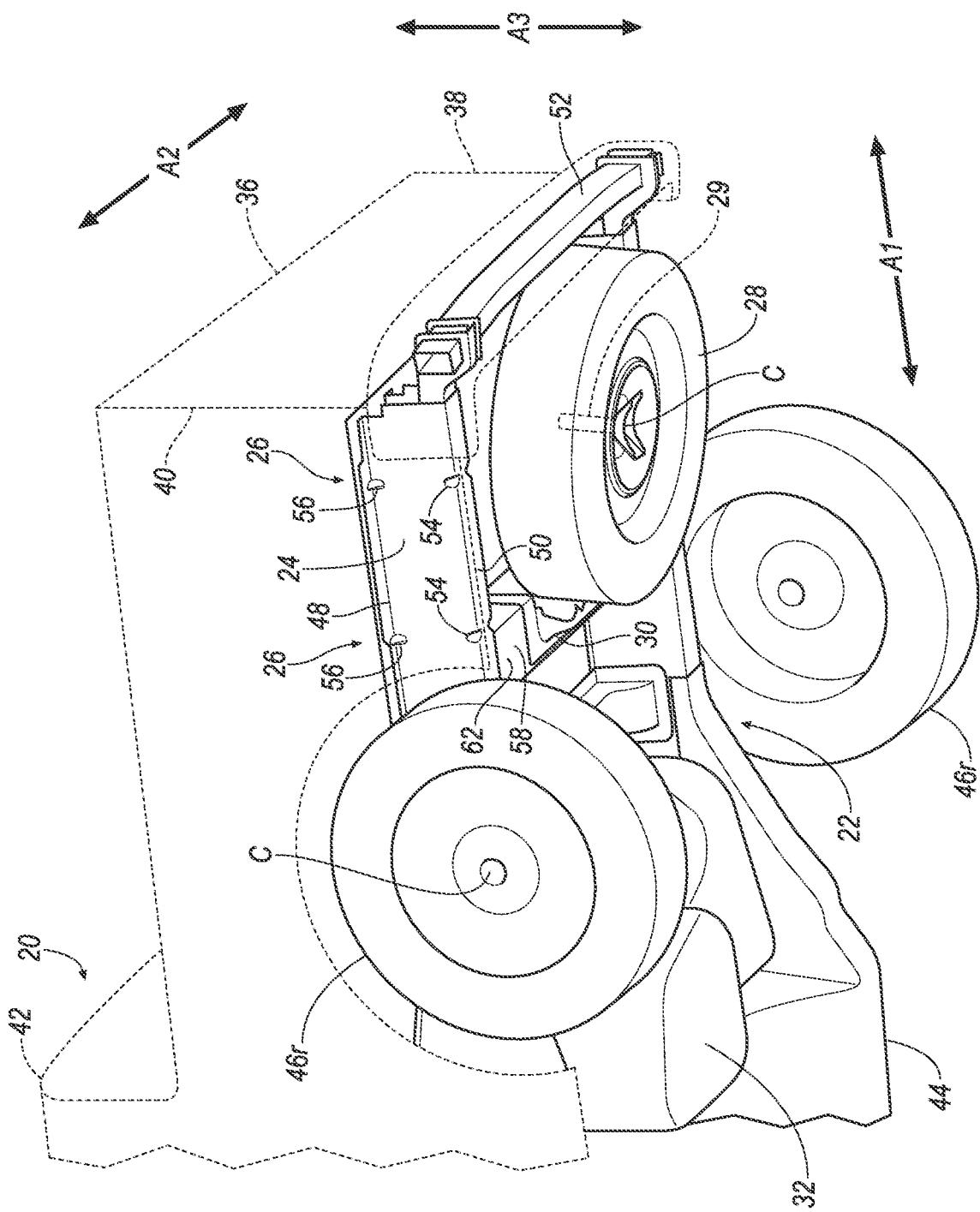
FIG. 2 is a bottom perspective view of the vehicle.
Figure 3:
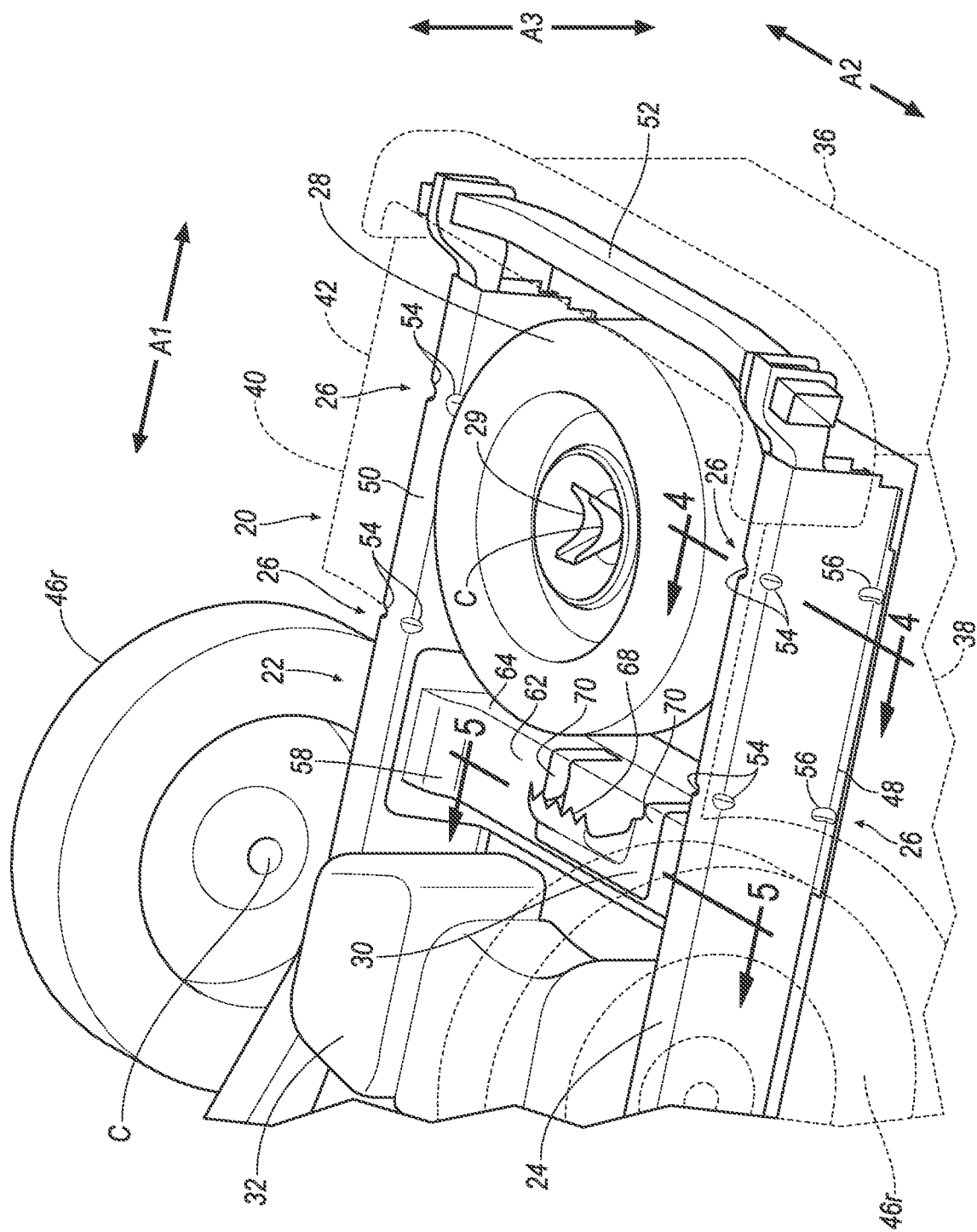
FIG. 3 is a bottom perspective view of the vehicle.
Figure 4:
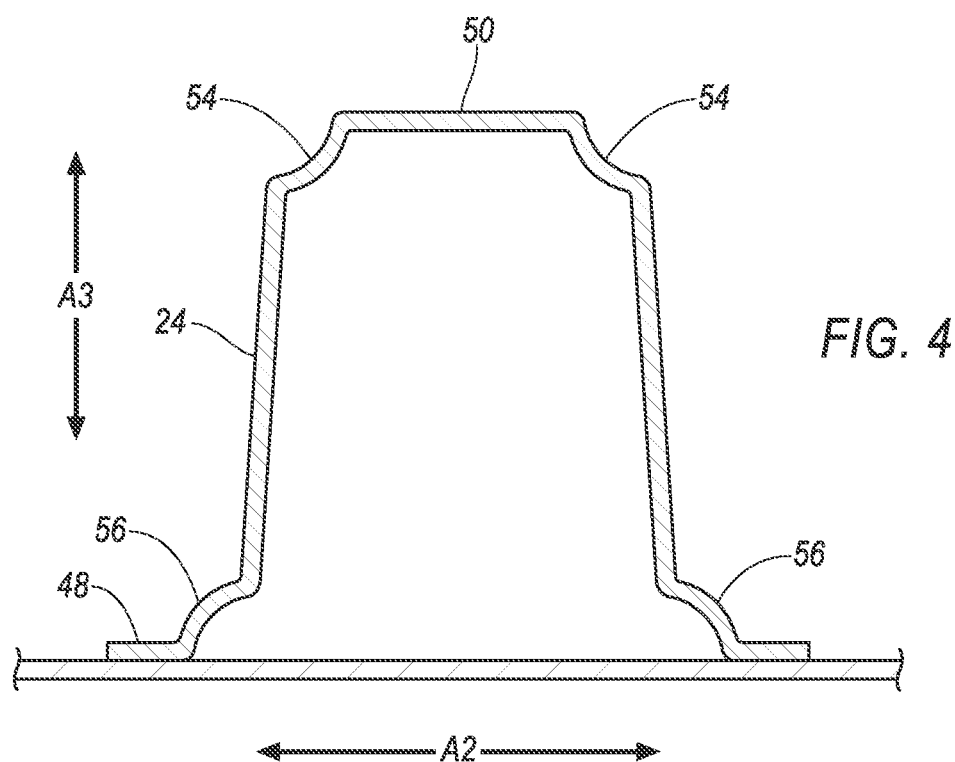
FIG. 4 is a cross section taken along a line 4-4 in FIG. 3.
Figure 6:
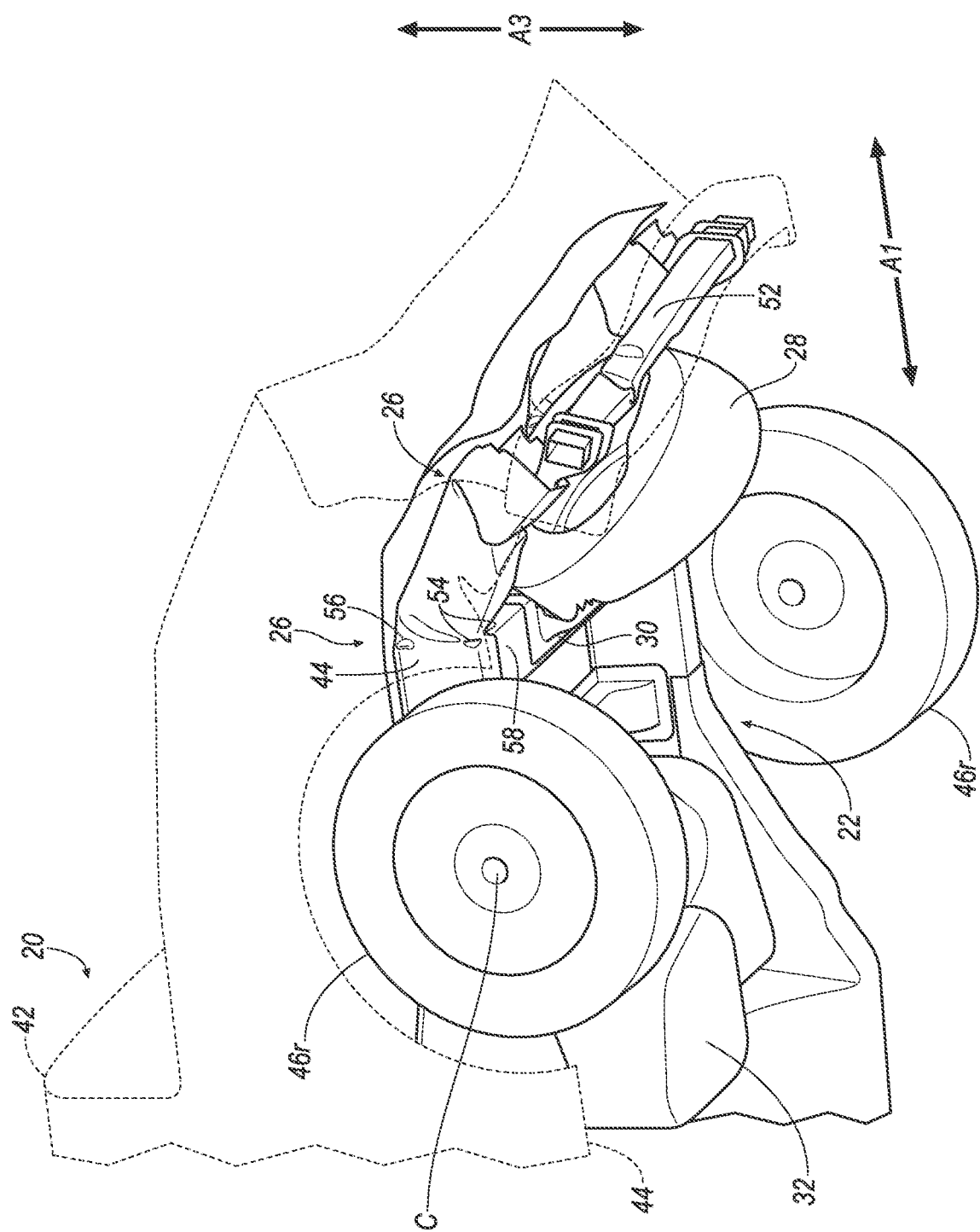
FIG. 6 is a bottom perspective view of the vehicle after a rear impact.

The downward deformation zones 26 of the frame rails 24 control deformation of the frame rails 24 such that the frame rails 24 are bendable at the downward deformation zones 26 from the first position to the second position, e.g., upon impact to the rear 36 of the vehicle 20. The frame rails 24 in the first position, illustrated in FIGS. 1-3, may be generally linear. The frame rails 24 in the second position, illustrated in FIG. 6, are beneath the first position. For example, the frame rails 24 in the second position may have downward bends at the downward deformation zones 26, e.g., relative to the vertical axis A3.

The downward deformation zones 26 of each of the frame rails 24 may be spaced from each other along the longitudinal axis A1. In other words, one of the downward deformation zones 26 on one of the frame rails 24 may be rearward of another downward deformation zone 26 on such frame rail 24 relative to the lateral axis A2.

The downward deformation zones 26 may be rearward of the spare tire retention member 30 and/or rearward of the pair of rear tires 46r, e.g., relative to the longitudinal axis A1. In other words, the downward deformation zones 26 may be closer to the rear 36 of the vehicle 20 than the spare tire retention member 30 and/or the rear tires 46r. For example, the downward deformation zones 26 may be between the bumper beam 52 at the rear 36 of the vehicle 20 and the spare tire retention member 30 and/or the rear tires 46r along the longitudinal axis A1. The position of the rear tires 46r may be a position of a center C of the rear tires 46r.

The downward deformation zones 26 control deformation of the frame rails 24 by having greater strength in compression at the top 48 of the frame rails 24 than at the bottom 50. In other words, the bottom 50 of the frame rail 24 may compress more than the top 48 of the frame rail 24 at the downward deformation zones 26 under a common amount of applied compressive force.

Each of the downward deformation zones 26 may include a weakened feature 54 at the bottom 44 of the respective frame rail 24. The weakened feature 54 reduces strength of the frame rail 24 proximate the weakened feature 54. For example, the frame rail 24 may have a reduced cross-sectional area and/or width (and increased stress) at the weakened feature 54, e.g., compared above the weakened feature 54 and at the top 48 of the frame rail 24 at the downward deformation zone 26. In other words, the weakened feature 54 may be a depression, as shown in the Figures. Each of the downward deformation zones 26 may include a second weakened feature 54 at the bottom 50 of the respective frame rail 24 and opposite the weakened feature 54 along the lateral axis A2. For example, each downward deformation zone 26 may include one weakened feature 54 at the bottom 50 and at an inboard side of the respective frame rail 24 and may include another weakened feature 54 at the bottom 50 and at an outboard side of the respective frame rail 24. The inboard and outboard weakened features 54 of one of the downward deformation zones 26 may be aligned with each other relative to the longitudinal axis A1. In other words, the inboard and outboard weakened features 54 of the downward deformation zone 26 may be at a common positional relative to the longitudinal axis A1, e.g., spaced from the bumper beam 52 along the longitudinal axis A1 by a common distance.

Each of the downward deformation zones 26 may include a reinforcement 56 at the top 48 of the respective frame rail 24. The reinforcement 56 increases strength of the frame rail 24 proximate the reinforcement 56. For example, the frame rail 24 may have an increased cross-sectional area and/or width (and reduced stress) at the reinforcement 56, e.g., compared to beneath the reinforcement 56 and at the bottom 50 of the frame rail 24 at the downward deformation zone 26. Each of the downward deformation zones 26 may include a second reinforcement 56 at the bottom 50 of the respective frame rail 24 and opposite the reinforcement 56 along the lateral axis A2. For example, each downward deformation zone 26 may include one reinforcement 56 at the top 48 and at the inboard side of the respective frame rail 24 and may include another reinforcement 56 at the top 48 and at the outboard side of the respective frame rail 24. The inboard and outboard reinforcements 56 of the downward deformation zone 26 may be at a common positional relative to the longitudinal axis A1, e.g., spaced from the bumper beam 52 along the longitudinal axis A1 by a common distance. The weakened features 54 and the reinforcements 54 of each of the downward deformation zones 26 may be spaced from the bumper beam 52 along the longitudinal axis A1 by a common distance.

The frame assembly 22 may include a crossmember 58. The crossmember 58 increases strength and rigidity of the vehicle 20, e.g., to provide enhanced driving and/or crash characteristics to the vehicle 20. The crossmember 58 is elongated along the lateral axis A2, e.g., extending from one of the frame rails 24 to the other of the frame rails 24. The crossmember 58 may be fixed to the frame rails 24, e.g., via fastener, weld, etc.

Figure 5:
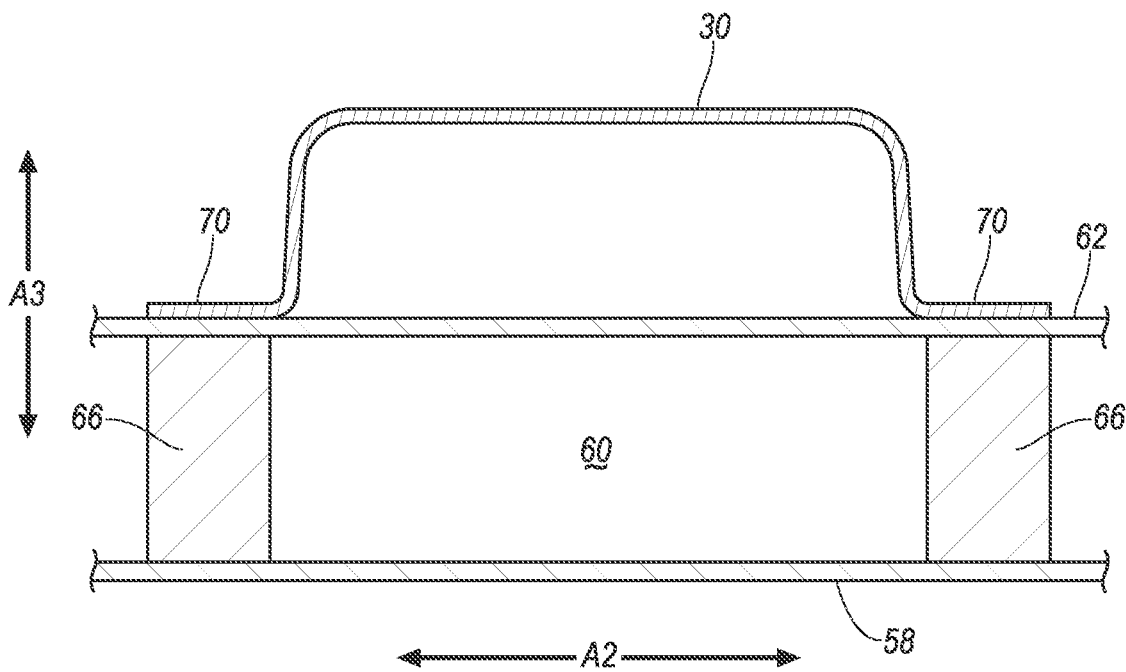
FIG. 5 is a cross section taken along a line 5-5 in FIG. 3.

The crossmember 58 may be hollow, i.e., defining a chamber 60 therein, as illustrated in FIG. 5. For example, the crossmember 58 may be a tube having a rectangular cross section. The crossmember 58 may include a bottom surface 62, e.g., facing downward relative to the vertical axis A3. The crossmember 58 may include a rear surface 64, e.g., facing rearward relative to the longitudinal axis A1.

The crossmember 58 may include one or more diaphragms 66 in the chamber 60. The diaphragm 66 increases strength of the crossmember 58 proximate the diaphragm 66. The diaphragm 66 may extend from a top to a bottom of the crossmember 58. The diaphragm 66 may extend from a front to a rear of the crossmember 58.

The spare tire 28 is a replacement for one of the tires 46f, 46r, e.g., when one of the tires 46f, 46r is flat or otherwise inoperable. The spare tire 28 may be designed for limited use, e.g., having a lower speed rating, a smaller diameter, etc., than the tires 46f, 46r. The spare tire 28 is supported by the frame assembly 22 between the pair of frame rails 24, e.g., relative to the longitudinal axis A1. For example, the spare tire 28 may be supported via a tire mount 29 between the frame rails. The tire mount 29 may incudes a threaded shaft, bracket, fastener, etc. The tire mount 29 may be fixed to the frame assembly 22, e.g., via weld, fastener, etc. The spare tire 28 may be supported at the downward deformation zones 26. For example, a center C of the spare tire may be between the downward deformation zones 26 along the longitudinal axis A1. In other words, one of the downward deformation zones 26 of one of the frame rails 24 may be between the front 34 of the vehicle 20 and the center C of the spare tire 28, and the other of the downward deformation zones 26 of such frame rail 24 may be between the rear 36 of the vehicle 20 and the center C of the spare tire 28.

The spare tire retention member 30 restricts forward motion of the spare tire 28, e.g., during a rear impact to the vehicle 20. The spare tire retention member 30 may extend downward, e.g., from the crossmember 58, to a distal end. The spare tire retention member 30 may include one or more teeth 68, illustrated in FIG. 3. The teeth 68 may extend rearward, e.g., relative to the longitudinal axis A1. In other words, the teeth 68 may extend toward the rear 36 of the vehicle 20. The teeth 68 may be arranged along the lateral axis A2. The spare tire retention member 30 may be supported by the frame assembly 22. For example, the spare tire retention member 30 may be fixed to the crossmember 58, e.g., to the bottom surface 62 and the rear surface 64 of the crossmember 58. The spare tire retention member 30 may be fixed to the crossmember 58 via fastener, weld, etc. The spare tire retention member 30 may be at the diaphragm 66, e.g., such that force applied to the spare tire retention member 30 by the spare tire 28 is transferred to the crossmember 58 at the diaphragms 66. For example, the spare tire retention member 30 may extend between laterally spaced ends 70, and one diaphragm 66 may be at each end 70, as illustrated in FIG. 5. In other words, the ends 70 and the diaphragms 66 may be at common positions along the lateral axis A2.

The spare tire retention member 30 is between the pair of frame rails 24 relative to the lateral axis A2. For example, the frame rails 24 may be outboard of the spare tire retention member 30 relative to the lateral axis A2. The spare tire retention member 30 is forward of the downward deformation zones 26 relative to the longitudinal axis A1. In other words, the spare tire retention member 30 is between the front 34 of the vehicle 20 and the downward deformation zones 26. For example, the downward deformation zones 26 may be between the spare tire retention member 30 and the bumper beam 52 at the rear 36 of the vehicle 20.

The energy storage device 32 stores energy for operating the vehicle 20, e.g., for use by the propulsion system to generate torque applied to the tires 46f, 46r. The energy storage device 32 may be a battery assembly that stores electricity. The battery may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs). The energy storage device 32 may be a fuel tank that stores fuel, e.g., gasoline, diesel, natural gas, etc.

The energy storage device 32 is supported by the frame assembly 22 forward of the spare tire 28 relative to the longitudinal axis A1. In other words, the energy storage device 32 is between the spare tire 28 and the front 34 of the vehicle 20. The energy storage device 32 is supported forward of the spare tire retention member 30.

During normal operation of vehicle 20, the frame rails 24 are in the first position. Application of force to the rear 36 of the vehicle 20, such as force from a second vehicle rear-ending the vehicle 20, generates compression stress in the frame rails 24 and may move the frame rails 24 from the first position to the second position. The second position is lower that the first position, e.g., relative to the vertical axis A3. For example, the bumper beam 52 and the frame rail 24 at the rear 36 of the vehicle 20 of may be lower and further forward in the second position as compared to the first position. The spare tire 28 may be beneath the energy storage device 32 when the frame rails 24 are in the second position, e.g., such that forward movement of the spare tire 28 during the impact does not interfere with the energy storage device 32. For example, the spare tire 28 may be spaced from the energy storage device 32 relative to the vertical axis A3 when the frame rails 24 are in the second position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a pair of frame rails elongated along a longitudinal axis, each of the frame rails having a downward deformation zone, the frame rails bendable at the downward deformation zones from a first position to a second position beneath the first position;
a tire supported between the pair of frame rails at the downward deformation zones;
a spare tire retention member supported between the pair of frame rails forward of the downward deformation zones;
an energy storage device supported forward of the tire; and
the tire beneath the energy storage device when the frame rails are in the second position.

2. The vehicle of claim 1, wherein each of the frame rails includes a second downward deformation zone, and a center of the tire is between the downward deformation zones and the second deformation zones along the longitudinal axis.

3. The vehicle of claim 1, further comprising a pair of rear tires supported outboard of the frame rails, the downward deformation zones rearward of the pair of rear tires.

4. The vehicle of claim 1, wherein each of the downward deformation zones includes a weakened feature at a bottom of the respective frame rail.

5. The vehicle of claim 4, wherein each of the downward deformation zones includes a second weakened feature at the bottom of the respective frame rail and opposite the weakened feature along a lateral axis.

6. The vehicle of claim 1, wherein each of the downward deformation zones includes a reinforcement at a top of the respective frame rail.

7. The vehicle of claim 1, further comprising a crossmember elongated along a lateral axis and fixed to the frame rails, the spare tire retention member fixed to the crossmember.

8. The vehicle of claim 7, wherein the crossmember defines a chamber, and further comprising a diaphragm in the chamber, the spare tire retention member at the diaphragm.

9. The vehicle of claim 7, wherein the crossmember includes a bottom surface and a rear surface, the spare tire retention member fixed to the bottom surface and the rear surface.

10. An assembly, comprising:
a pair of frame rails elongated along a longitudinal axis, each of the frame rails having a downward deformation zone, the frame rails bendable at the downward deformation zones from a first position to a second position beneath the first position, each of the downward deformation zones includes a weakened feature at a bottom of the respective frame rail; and
a spare tire retention member supported between the pair of frame rails forward of the downward deformation zones.

11. The assembly of claim 10, wherein each of the downward deformation zones includes a second weakened feature at the bottom of the respective frame rail and opposite the weakened feature along a lateral axis.

12. The assembly of claim 10, wherein each of the downward deformation zones includes a reinforcement at a top of the respective frame rail.

13. The assembly of claim 10, further comprising a crossmember elongated along the lateral axis and fixed to the frame rails, the spare tire retention member fixed to the crossmember.

14. The assembly of claim 13, wherein the crossmember defines a chamber, and further comprising a diaphragm in the chamber, the spare tire retention member at the diaphragm.

15. The assembly of claim 10, further comprising a tire mount between the frame rails, the tire supported by the tire mount.

16. The assembly of claim 10, further comprising a bumper beam elongated along a lateral axis and supported by the frame rails, the downward deformation zones between the spare tire retention member and the bumper beam.

17. The assembly of claim 10, wherein each of the frame rails includes a second downward deformation zone rearward of the spare tire retention member and spaced from the downward deformation zones along the longitudinal axis.

18. A vehicle, comprising:
a pair of frame rails elongated along a longitudinal axis, each of the frame rails having a downward deformation zone, the frame rails bendable at the downward deformation zones from a first position to a second position beneath the first position, each of the downward deformation zones includes a reinforcement at a top of the respective frame rail;
a tire supported between the pair of frame rails at the downward deformation zones; and
a spare tire retention member supported between the pair of frame rails forward of the downward deformation zones.

19. The vehicle of claim 18, wherein each of the downward deformation zones includes a weakened feature at a bottom of the respective frame rail.

20. The vehicle of claim 18, further comprising an energy storage device supported forward of the tire, the tire beneath the energy storage device when the frame rails are in the second position.

* * * * *